United States Patent
Diels et al.

(10) Patent No.: US 11,422,320 B1
(45) Date of Patent: Aug. 23, 2022

(54) STABILIZATION SYSTEM BASED ON PROPERTIES OF POLARIZATION MAINTAINING FIBERS

(71) Applicant: STC.UNM, Albuquerque, NM (US)

(72) Inventors: Jean-Claude Diels, Albuquerque, NM (US); Hanieh Afkhamiardakani, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 197 days.

(21) Appl. No.: 16/847,607

(22) Filed: Apr. 13, 2020

Related U.S. Application Data

(60) Provisional application No. 62/863,512, filed on Jun. 19, 2019, provisional application No. 62/833,429, filed on Apr. 12, 2019.

(51) Int. Cl.
*G02B 6/42* (2006.01)
*G01K 11/32* (2021.01)

(52) U.S. Cl.
CPC ............ *G02B 6/4218* (2013.01); *G01K 11/32* (2013.01)

(58) Field of Classification Search
None
See application file for complete search history.

(56) References Cited

U.S. PATENT DOCUMENTS

| | | | | |
|---|---|---|---|---|
| 4,263,810 A * | 4/1981 | Chiu | ................... | G01B 11/168 250/225 |
| 5,107,512 A * | 4/1992 | Shibutani | .............. | H01S 5/0687 372/105 |
| 5,561,726 A * | 10/1996 | Yao | ........................... | G01J 4/00 356/365 |
| 6,429,939 B1* | 8/2002 | Bennett | .................. | G01C 19/72 356/463 |

FOREIGN PATENT DOCUMENTS

KR    WO 2018/169165    * 11/2017

* cited by examiner

*Primary Examiner* — Chad H Smith
(74) *Attorney, Agent, or Firm* — Keith Vogt, Ltd.; Keith A. Vogt

(57) ABSTRACT

A nonlinear transmission system comprising a polarization maintaining (PM) fiber and a polarizer, based on the extreme sensitivity of the state of polarization of transmitted light on various parameters, such as the temperature, the optical power input to the fiber. Passive stabilization is achieved by simply terminating the PM fiber by a polarizer at a selected angle. Active stabilization of the optical length of the PM fiber is achieved by feeding back the transmitted into the control of optical power sent through the fiber.

7 Claims, 12 Drawing Sheets

STABILIZATION SYSTEM BASED ON PROPERTIES OF POLARIZATION MAINTAINING FIBERS

RELATED APPLICATIONS

This application claims the benefit of U.S. Provisional Application Nos. 62/833,429 filed Apr. 12, 2019 and 62/863,512 filed Jun. 19, 2019, both of which are herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Polarization maintaining (PM) fibers are fabricated with two different refractive indices along two perpendicular axes (slow and fast axes). This property preserves the polarization of a linearly polarized light when it is sent along the slow or fast axis of the fiber. If the polarization of light is not a long one of these axes or it is not linearly polarized, the PM fiber acts as a waveplate with a beat length (the length of fiber for which the initial polarization of light is repeated) of a few millimeters. The design and construction of PM fibers are well known with designs often referred to as PANDA or BOW-TIE with different amounts of birefringence.

BRIEF SUMMARY OF THE INVENTION

Polarization maintaining (PM) fibers can be viewed as waveplates of an extremely high order. Therefore, the state of polarization of light transmitted through these fibers is extremely sensitive to the physical properties of the fiber, such a temperature, power transmitted, etc. . . . . The object of the present invention is to exploit these properties to actively control the transmitted power, for instance by stabilizing it. We show also how the transmission properties of a PM fiber can be exploited to actively stabilize the optical length of PM fiber.

In one embodiment, the present invention provides a system that uses the transmission of circularly polarized light into a piece of PM fiber for the following aims; measurement of the fiber temperature with a sensitivity of the order of 0.02° C. per 6 cm of a PM fiber; measurement of the power of continuous or pulsed light propagating through the PM fiber; temperature and optical path length stabilization of fiber, using the transmitted polarization as an error signal, and the power sent through the fiber as a correcting element; magnetometry; saturable absorption; and monitoring of heating/cooling in fiber amplifiers.

In one embodiment, the present invention provides a temperature sensing system using polarization-maintaining (PM) fibers that are fabricated to have different refractive indices along two perpendicular axes (slow and fast axes).

In other embodiments, the present invention provides a system and device wherein the output polarization of light depends on the surrounding temperature.

In other embodiments, the present invention provides a system and device adapted for use as a temperature sensor having a sensitivity of 0.02° C.

In other embodiments, the present invention provides a system and device adapted to actively control and stabilize the optical length of fiber by measuring the transmission of circularly polarized light and keeping it at a constant value through power correction of a laser.

In another embodiment, the present invention provides a method of sensing temperature change in an object comprising the steps of: contacting the object with at least one PM fiber; coupling a semiconductor laser to a polarization controller to generate a circularly polarized beam (polarization controller can be simply replaced by a 45° splice between the PM fiber coming out of the linearly polarized laser and the PM fiber under test. Then a linearly polarized light at 45° with respect to the axis of PM fiber will be used as the initial polarization; launching the circularly polarized light into one end of the PM fiber; and extracting the state of polarization from measurements of the transmitted power versus polarizer angle, to determine a change in temperature of the object.

In another embodiment, the present invention provides an optical transmission stabilization system comprising: a laser source having a current controller for producing a polarized beam of a predetermined power; a polarization maintaining (PM) fiber having a fast axis and a slow axis; a polarizer; and wherein power transmitted by the polarizer depends in a nonlinear fashion on the polarized beam of a predetermined power and an angle of the polarizer.

In another embodiment, the present invention provides an optical transmission stabilization system wherein the laser source produces a circularly polarized transmission.

In another embodiment, the present invention provides an optical transmission stabilization system wherein the laser source produces a linearly polarized beam launched at an angle with respect of the slow axis of the PM fiber.

In another embodiment, the present invention provides an optical transmission stabilization system wherein the angle of the polarizer attenuates fluctuations of input power.

In another embodiment, the present invention provides an optical transmission stabilization system wherein the angle of the polarizer attenuates fluctuations of input power.

In another embodiment, the present invention provides an optical transmission stabilization system wherein the angle of the polarizer is chosen such that the transmission of the input beam increases with power.

In another embodiment, the present invention provides an optical transmission stabilization system wherein the angle of the polarizer is chosen such that the transmission of the input beam increases with power.

In another embodiment, the present invention provides an optical transmission stabilization system further including a detector wherein a signal from the detector is fed to the current control to change the transmission of the laser source.

In another embodiment, the present invention provides an optical transmission stabilization system further including a detector wherein a signal from the detector is fed to the current control to change the transmission of the laser source.

In another embodiment, the present invention provides an optical transmission stabilization system wherein the PM fiber is a branch of an interferometer having a feedback loop that varies the power of the circularly polarized beam to maintain a constant optical fiber length.

In another embodiment, the present invention provides an optical transmission stabilization system wherein the PM fiber is a branch of an interferometer having a feedback loop that varies the power of the polarized beam to maintain a constant optical fiber length.

In another embodiment, the present invention provides an optical transmission stabilization system wherein the PM fiber is a branch of an interferometer having a feedback loop that varies the power of the circularly polarized beam to maintain a constant optical fiber length.

In another embodiment, the present invention provides an optical transmission stabilization system wherein the PM fiber is a branch of an interferometer having a feedback loop that varies the power of the polarized beam to maintain a constant laser length.

In another embodiment, the present invention provides an optical transmission stabilization system wherein the PM fiber is a branch of an interferometer having a feedback loop that varies the power of the circularly polarized beam to maintain a constant laser length.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

In a preferred embodiment, as shown in FIG. 1, the present invention provides a temperature sensor system 100. The present invention is able to achieve 0.02° C. sensitivity to measure temperature which can be enhanced by stabilizing the temperature controller.

Temperature Measurements

Figure 1A:
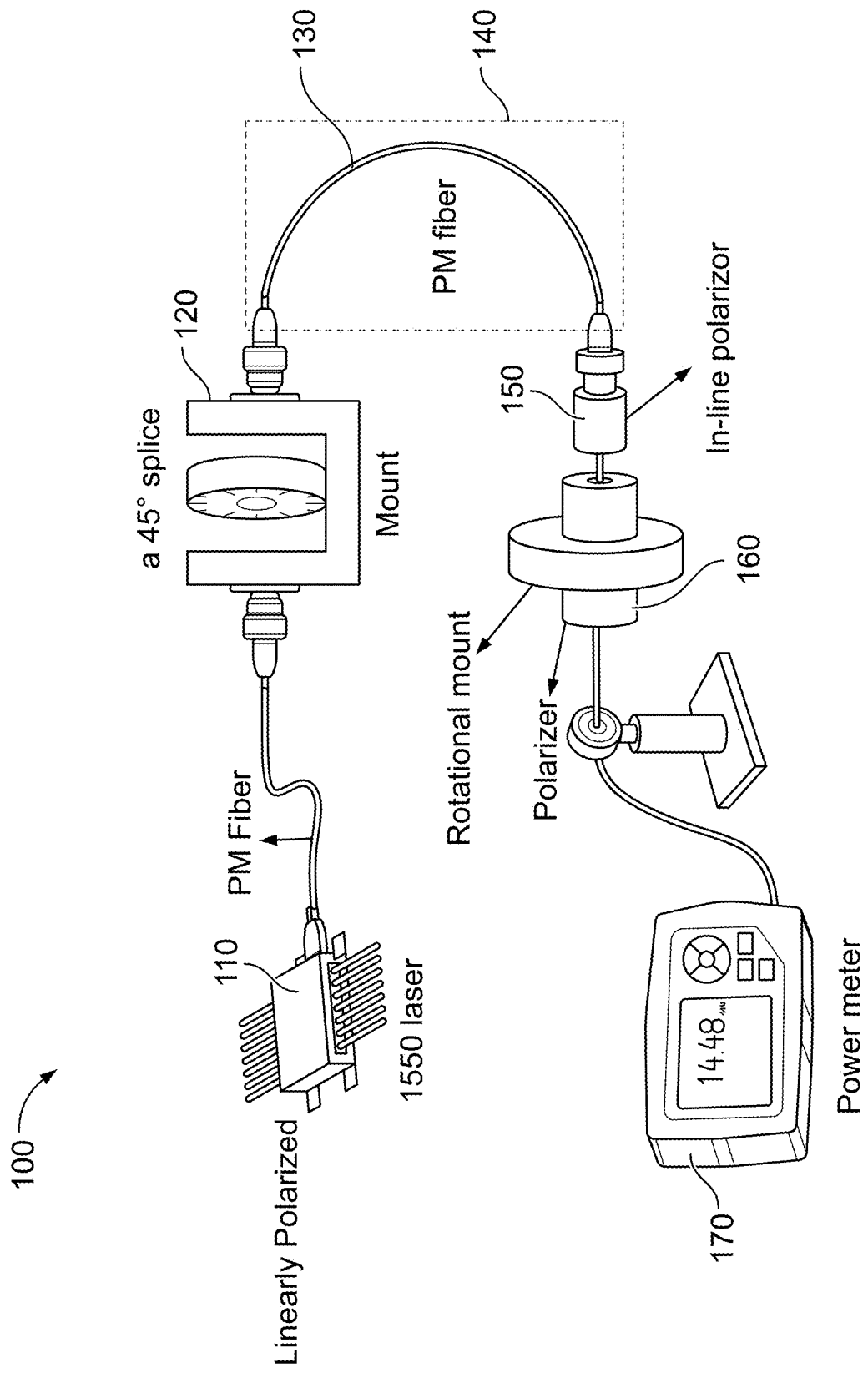
FIG. 1A illustrates, for an embodiment of the present invention, the coupling of a semiconductor laser to a polarization controller to generate a circularly polarized beam that is launched into a length of PM fiber; the polarization ellipse of the transmitted beam is analyzed via a rotating polarizer.
Figure 1B:
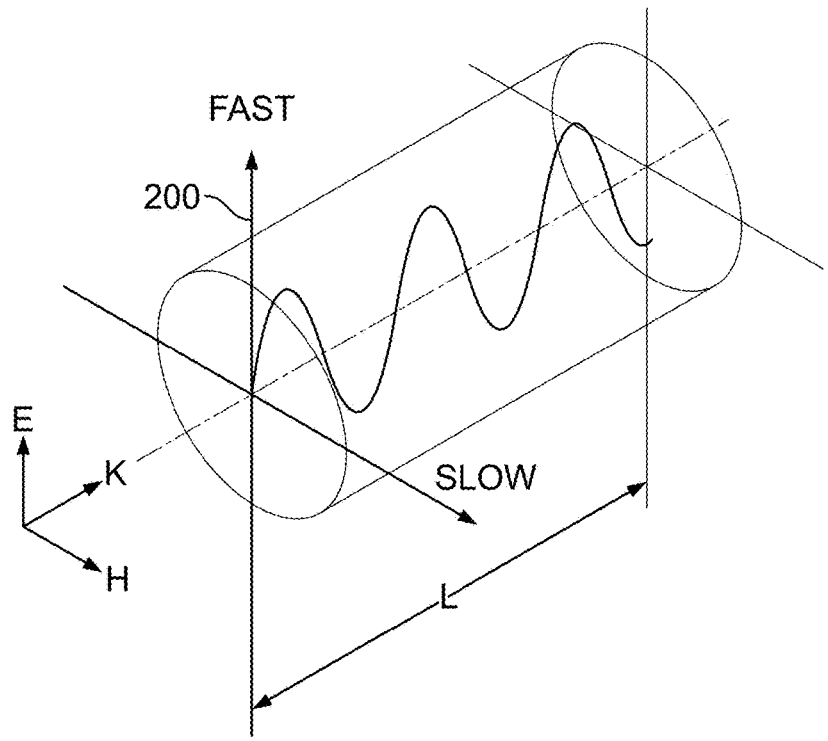
FIG. 1B illustrates a fast axis in a PM fiber.
Figure 1C:
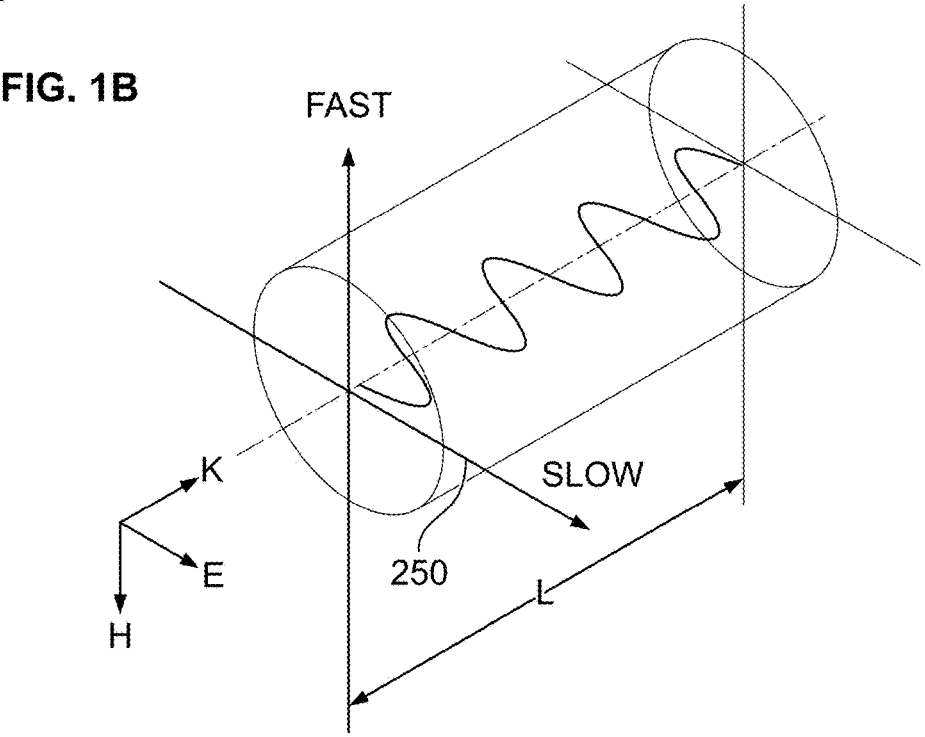
FIG. 1C illustrates a slow axis in a PM fiber.
Figure 2A:
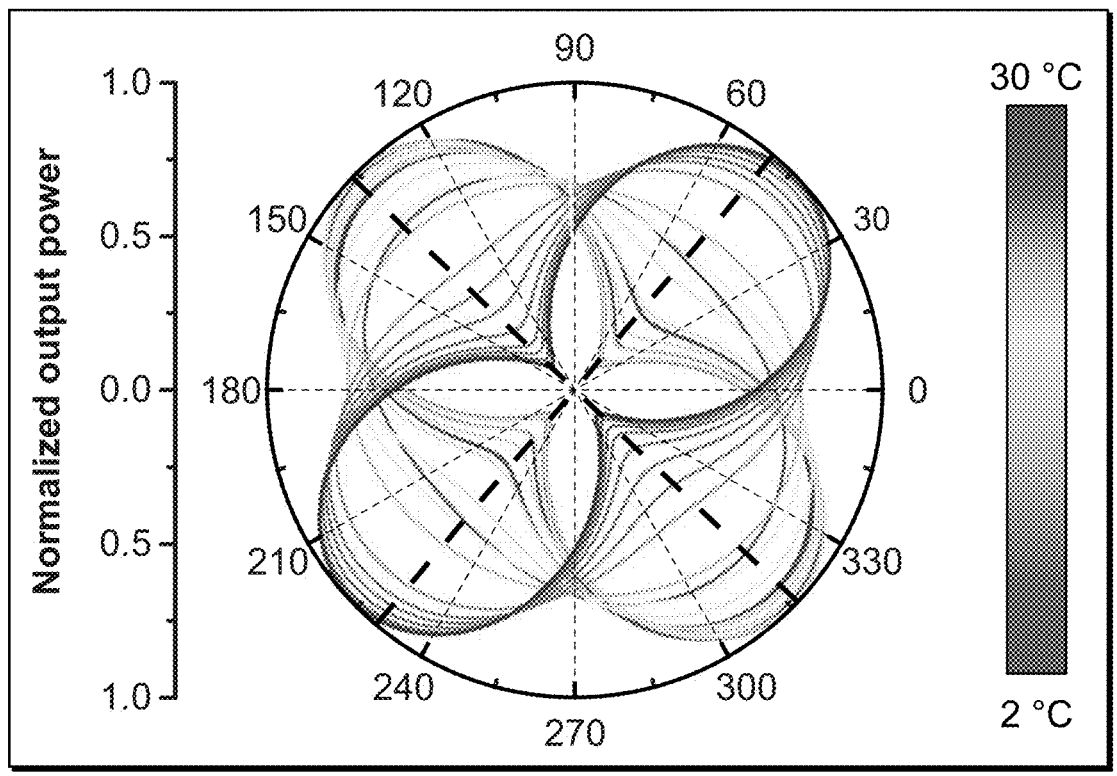
FIG. 2A shows the polarization of light passing through a piece of PM fiber at temperatures from 2 to 30° C. for an embodiment of the present invention.
Figure 2B:
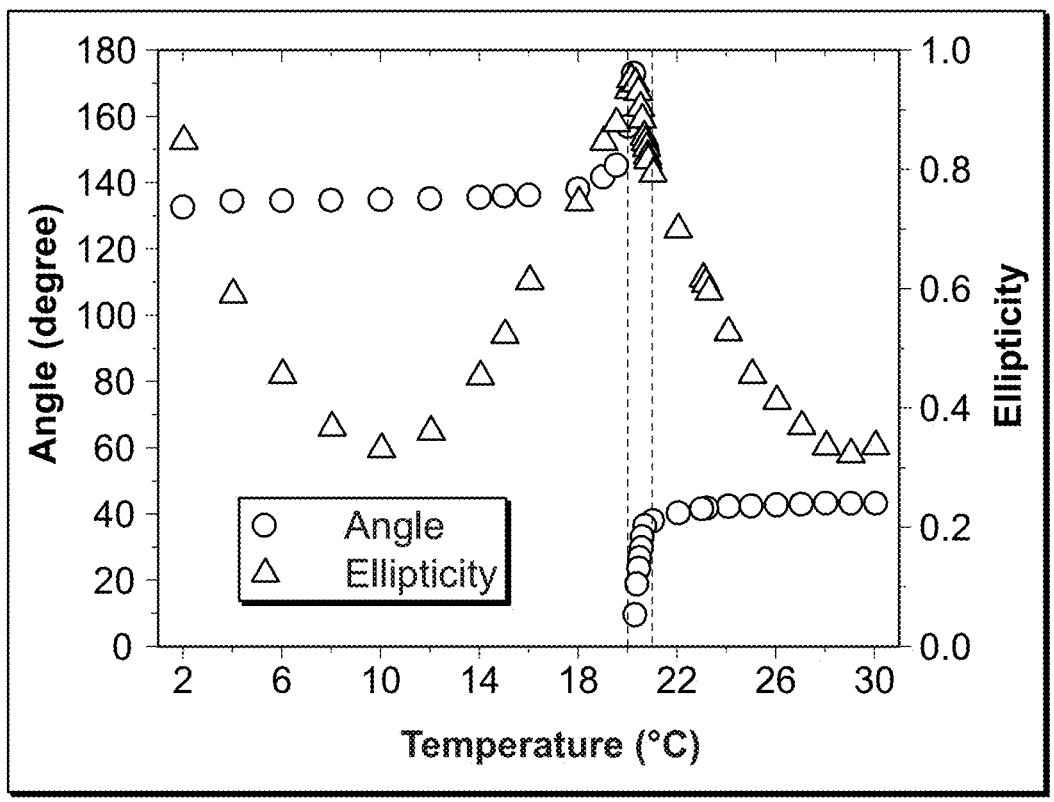
FIG. 2B shows ellipticity and the angle of polarization ellipse versus temperatures from 2 to 30° C. for an embodiment of the present invention.
Figure 2C:
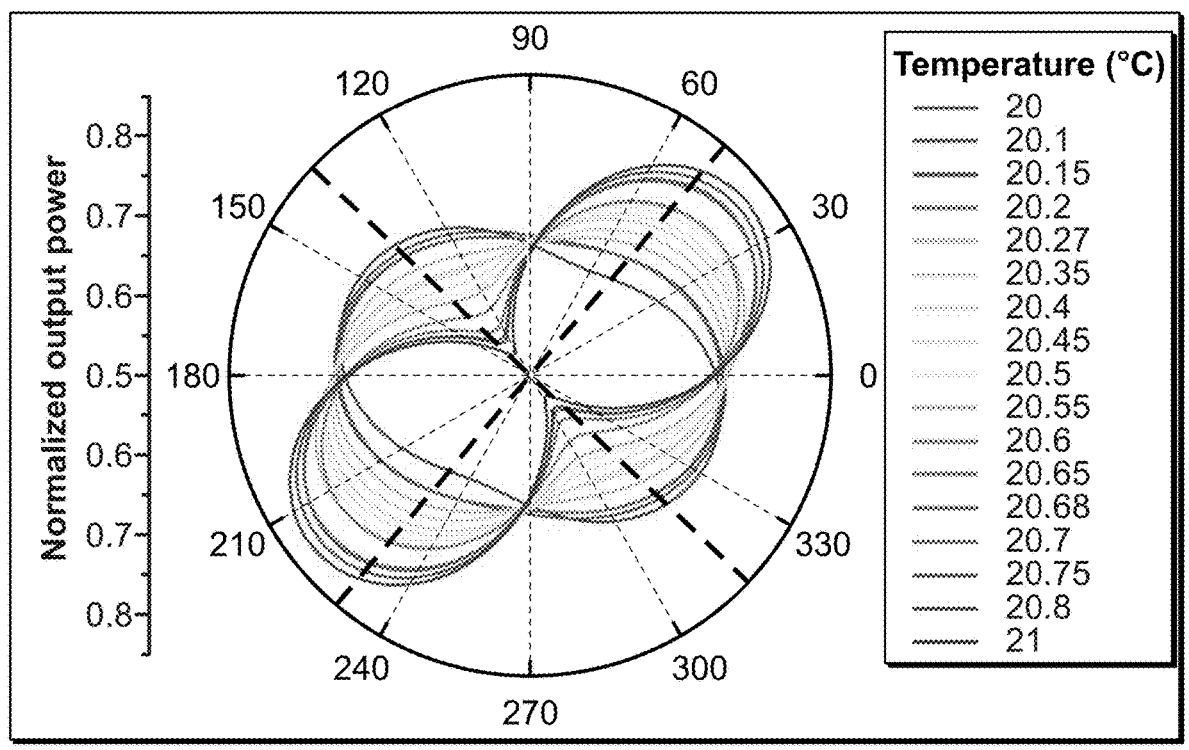
FIG. 2C shows the polarization of light passing through a piece of PM fiber at temperatures from 20 to 21° C. for an embodiment of the present invention.
Figure 2D:
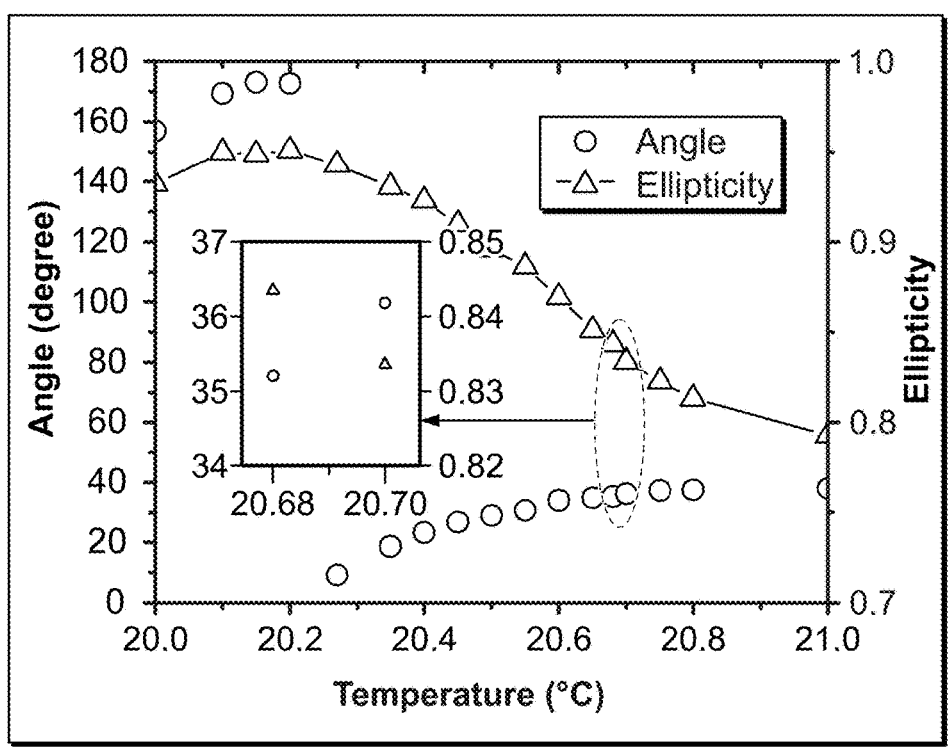
FIG. 2D shows ellipticity and the angle of polarization ellipse versus temperatures from 20 to 21° C. for an embodiment of the present invention.

FIG. 1A illustrates how the transmitted polarization is analyzed, for a circular polarization launched into a length of PM fiber. The fiber temperature is controlled between 0 and 30° C. by a Peltier cooler. As shown, semiconductor laser 110 having a current controller is fiber coupled to a polarization controller 120 to generate a circularly polarized beam that is input into one end of a length of PM fiber 130. As also shown, fiber 130 is in contact with object 140 which is to be monitored for temperature changes. FIG. 1B illustrates fast axis 200 in PM fiber 130 and FIG. 1C illustrates slow axis 250 in PM fiber 130. As shown, the axes are perpendicular to each other.

The polarization ellipse of the transmitted beam passes through PM fiber 130 and into collimator 150. The output beam from collimator 150 may be analyzed via a rotating polarizer 160 and power meter 170. For the embodiment shown in FIG. 1, measurements were taken between 0 and 30° C. are shown in FIG. 2.

In the measurements illustrated in FIG. 2, only 6 cm of the 17.5 cm long PM fiber is exposed to the temperature changes.

The polarization controller can be simply replaced by an off-axis splice, preferably 45°, to excite two polarization modes of the PM fiber equally.

Figure 3A:
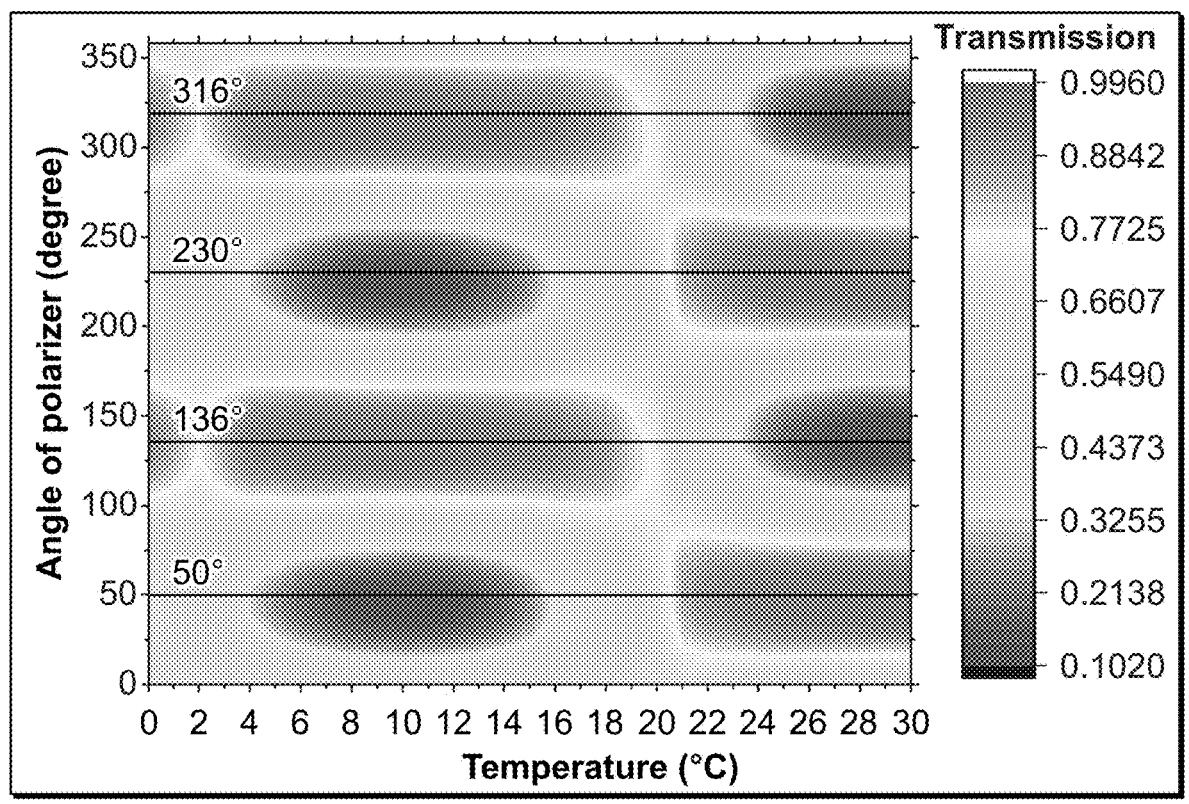
FIG. 3A shows transmission versus temperature for various angles of the polarizer for an embodiment of the present invention.
Figure 3B:
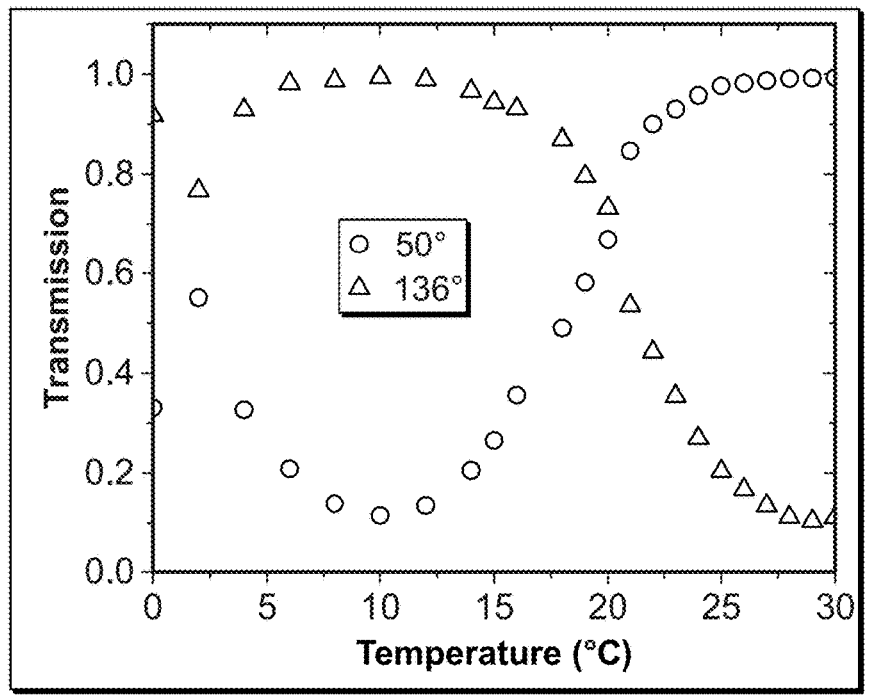
FIG. 3B shows transmission versus temperature for the polarizer angle at 50° C. and 136° C. for an embodiment of the present invention.

It has been discovered it is not necessary to measure the full polarization ellipse to determine the temperature. An alternative method is to put a polarizer at the end of the fiber and measure the transmission. FIG. 3 shows the change in transmission for various angles of the polarizer.

Figure 4A:
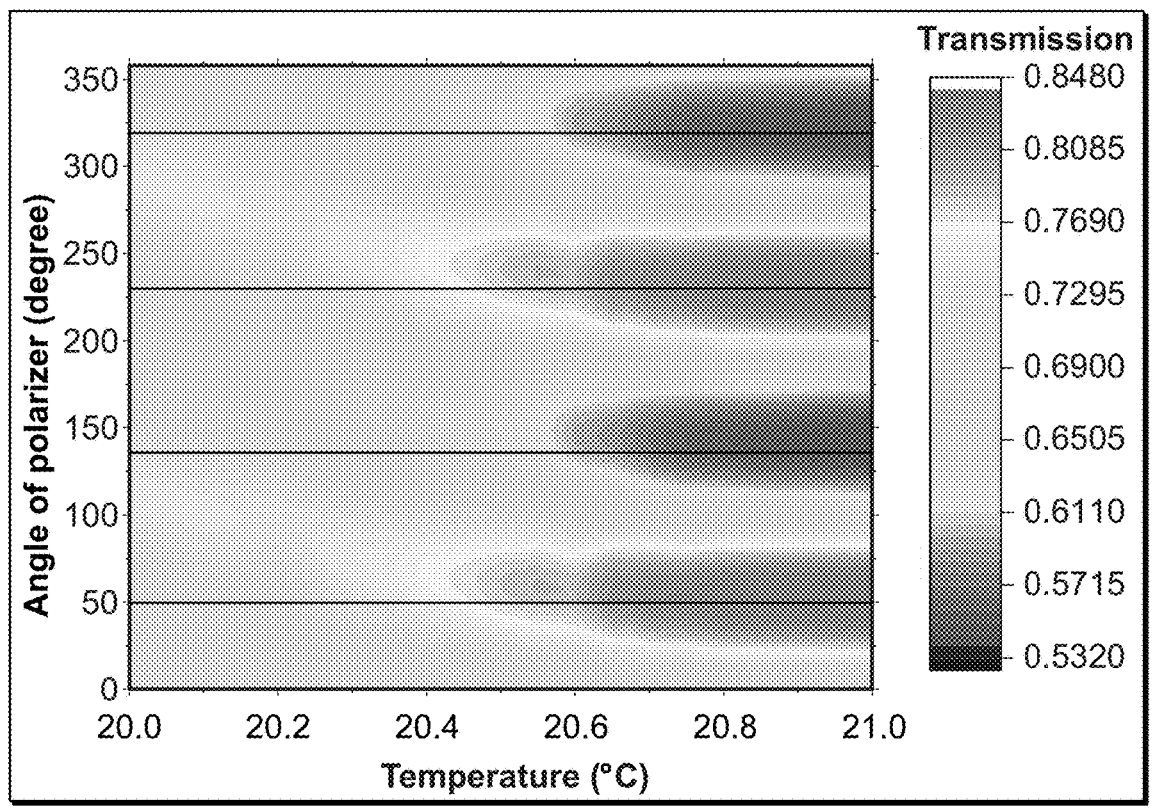
FIG. 4A shows transmission versus temperature for various angles of the polarizer in the range of 20 to 21° C. for an embodiment of the present invention.
Figure 4B:
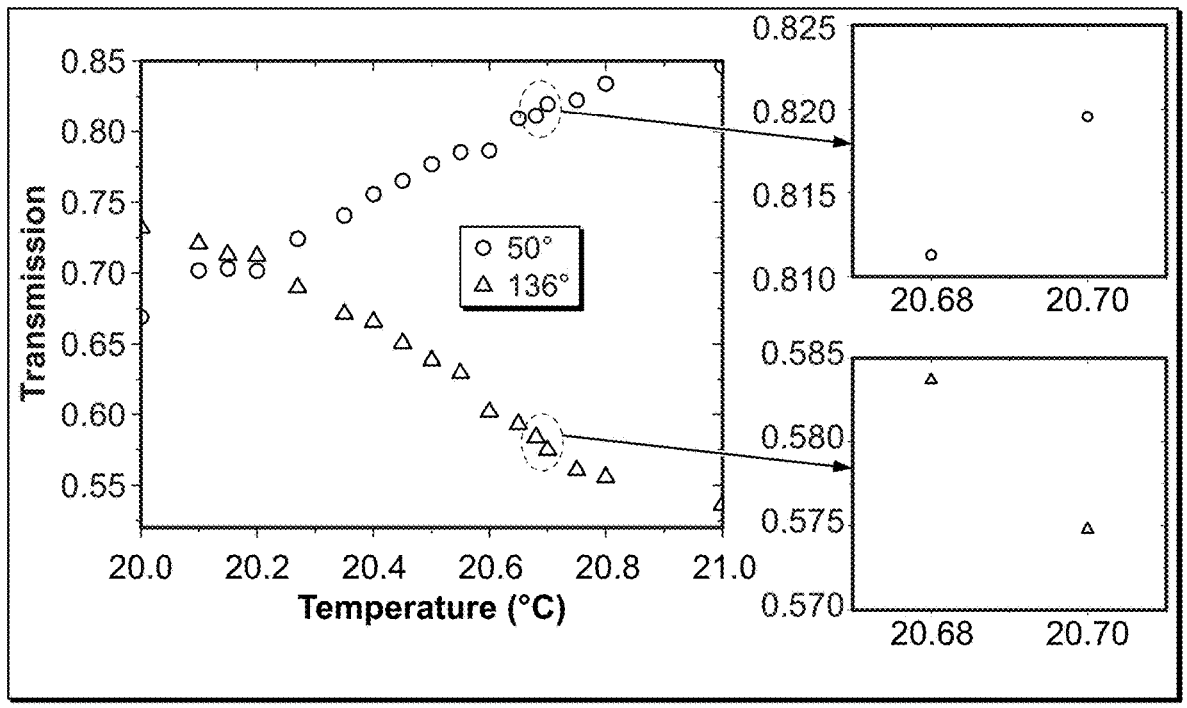
FIG. 4B shows transmission versus temperature for the polarizer angle at 50° C. and 136° C. with the insets showing a sensitivity of 0.02° C. for an embodiment of the present invention.

The temperature sensitivity is proportional to the fiber length. There is also an optimum polarizer angle for a given temperature range. FIG. 4 shows a temperature sensitivity of 0.02° C. for a 6 cm fiber (6 cm of a 17.5 cm PM fiber is exposed to temperature changes), around room temperature, for a polarizer angle of 50 or 136 degrees.

Power Measurements

Figure 5A:
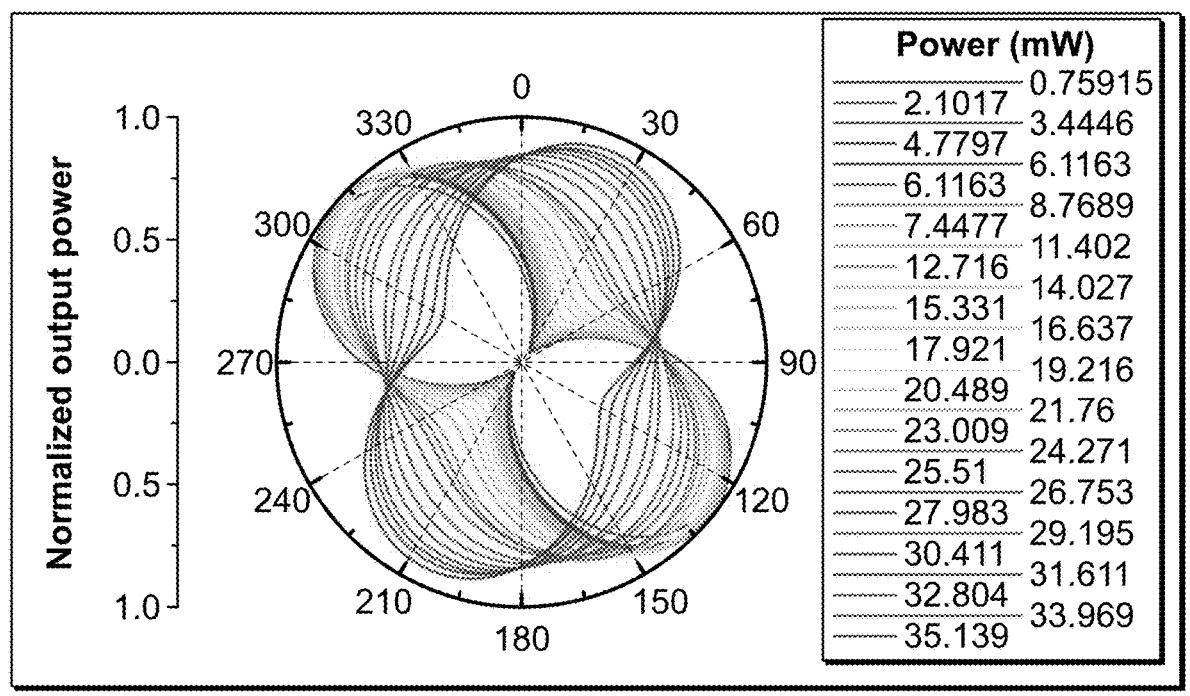
FIG. 5A shows raw data of the power transmission through a 17.5 cm patch cord for 30 different input powers for an embodiment of the present invention.
Figure 5B:
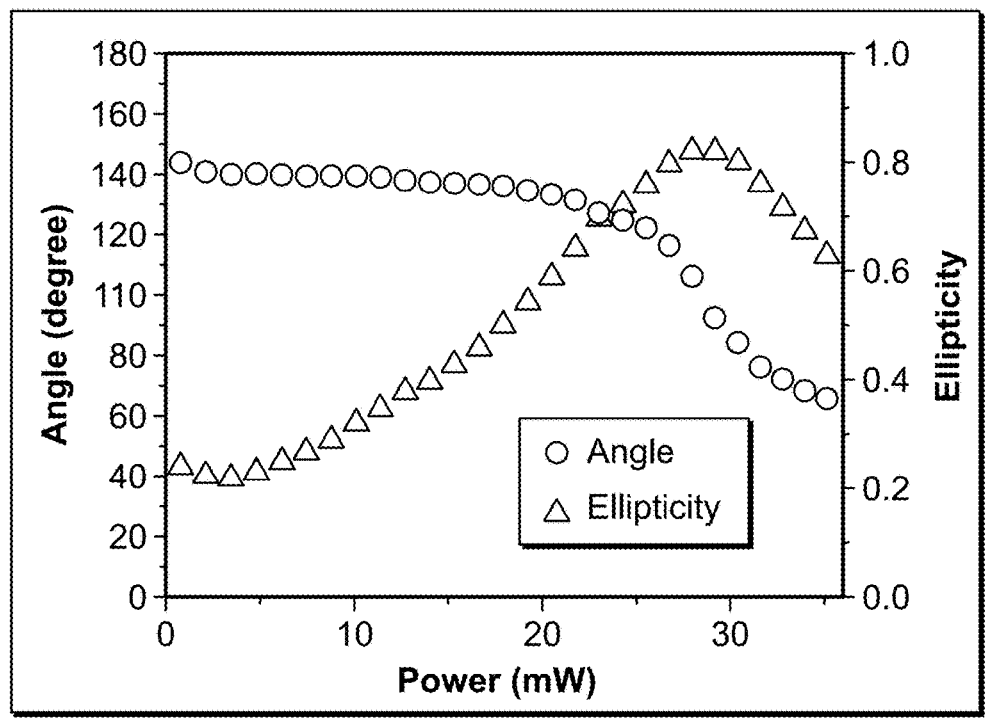
FIG. 5B shows the angle of the polarization ellipse and ellipticity versus power for an embodiment of the present invention.
Figure 5C:
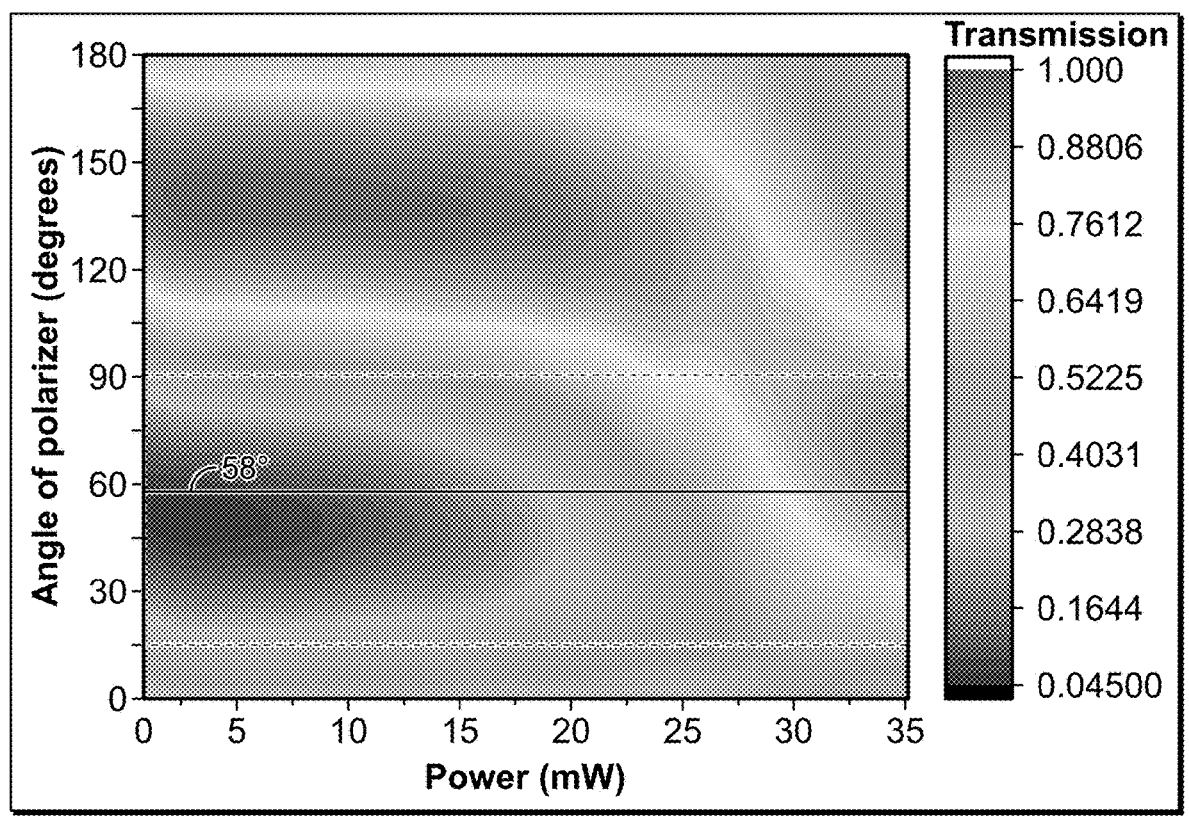
FIG. 5C shows transmission versus input power at different angles of polarizer for an embodiment of the present invention.

For other embodiments of the present invention, the following measurements are made at constant ambient temperature, but the laser power is varied in the range of 0 to 35 mW. The same polarization modification is seen as in the previous measurements, indicating that a few mW changes in the power of cw light passing through the PM fiber is sufficient to modify the stress-induced birefringence of the fiber. In the measurements illustrated in FIG. 5, the PM fiber had a length of 17.5 cm and a birefringence of 0.0005.

Applications

Saturable Absorption

Figure 6:
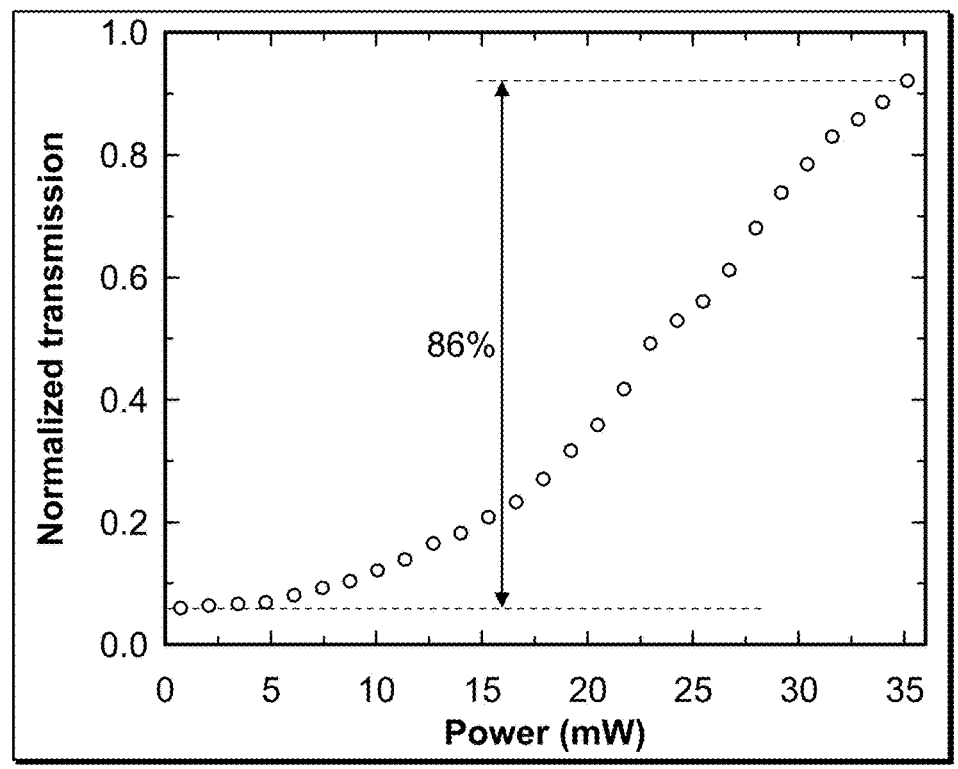
FIG. 6 depicts the transmission versus input power for the polarizer angle at 58° C. indicating a saturation curve for an embodiment of the present invention.

In another embodiment of the present invention, the change in transmission reaches 86% by increasing the power of light at polarizer angle of 58° as shown in FIG. 6. This short piece of PM fiber can be used as a saturable absorber with a very low saturation power. The power-dependent transmission is a nonlinearity at extremely low power, that can be exploited for making pulsed lasers and sensors of very low power consumption. It would also avoid the nonlinearities modifying the group and phase velocity of pulses in fiber-based sources of frequency combs and getting unstable at room temperature.

Power Change Measurements

Simple monitoring of the average power change of pulsed or continuous fiber lasers.

Fiber Core Temperature Measurement

Figure 7:
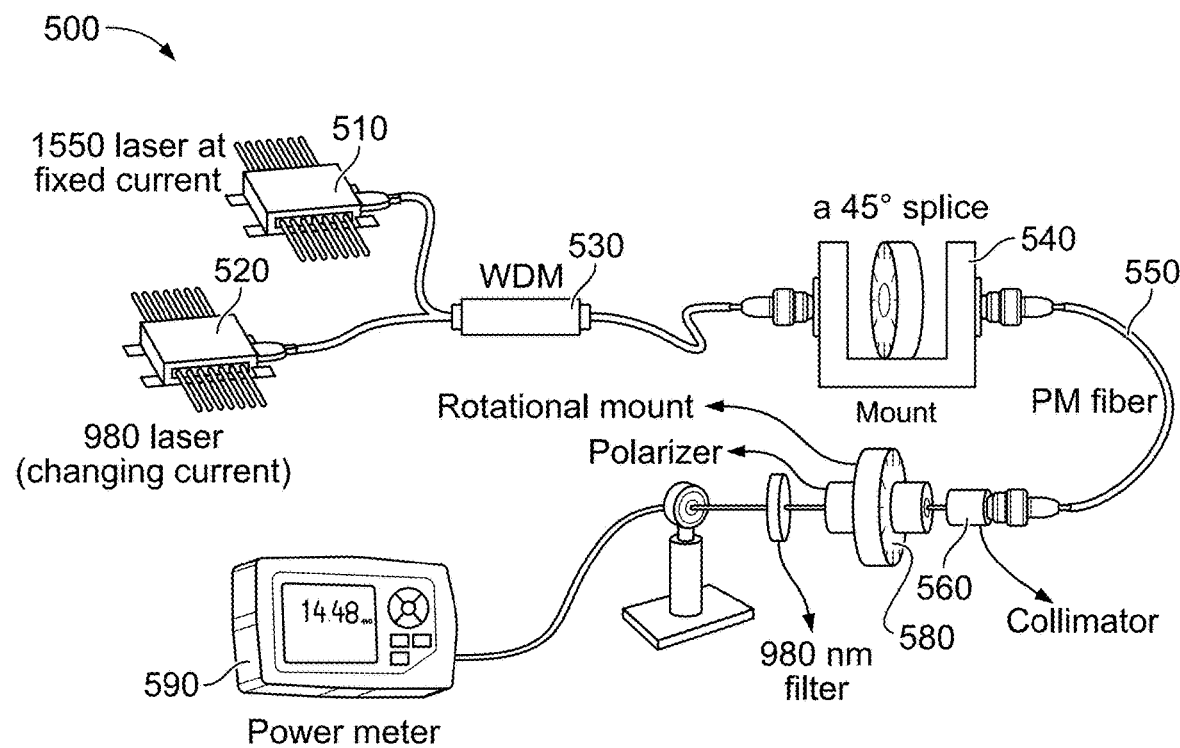
FIG. 7 shows a system for measuring the temperature of a fiber core for an embodiment of the present invention.

To measure the fiber core temperature, an embodiment of the present invention provides system 500 as shown in FIG. 7. As shown, 1550 nm laser light 510 is combined with a 980 nm laser 520 through a wavelength division multiplexer (WDM) 530 and sent to polarization controller 540 which may be a quarter waveplate (QWP) to sensor 550 which may be a 17.5 cm of a PM fiber 550. The polarization ellipse of the transmitted beam passes through PM fiber 550 and into collimator 560. The output beam from collimator 560 may be analyzed via a rotating polarizer 580 and power meter 590. 1550 nm laser diode 510 is used to measure the polarization of light at the different powers of 980 nm laser 520. This method can be used to measure the cooling and heating of the fiber core.

Figure 8:
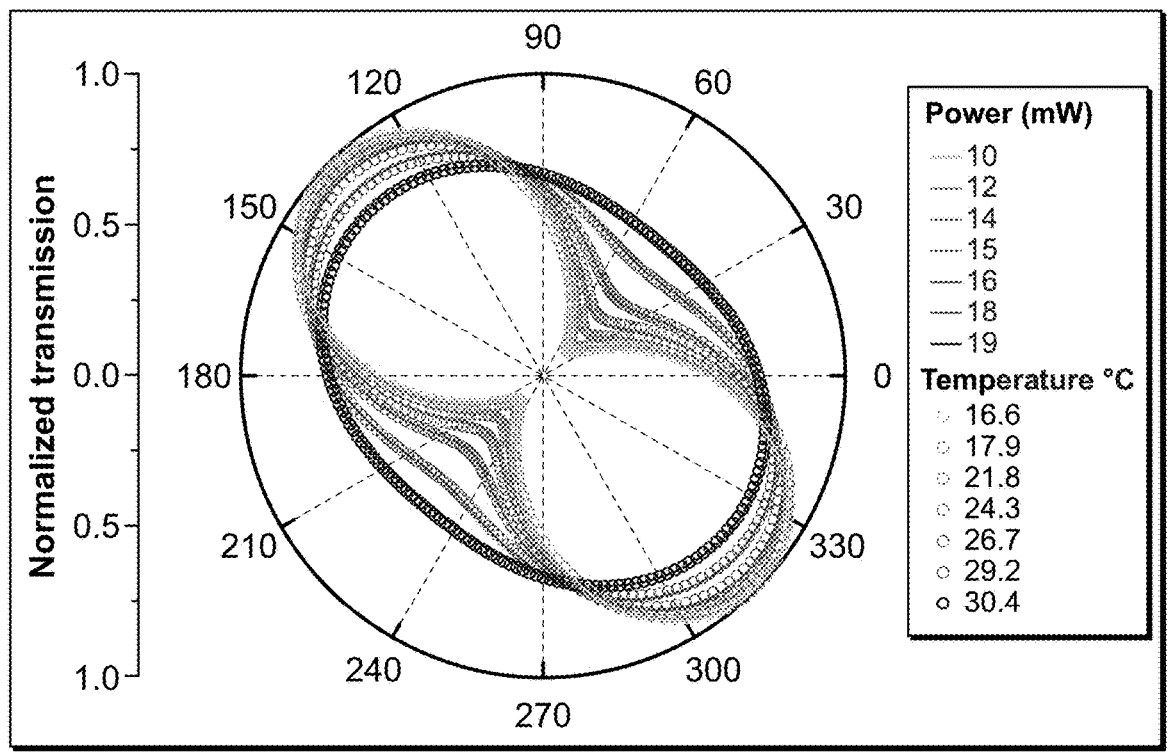
FIG. 8 shows a strong correlation between the polarization of light, at specific powers, passing through the PM fiber at specific temperatures for an embodiment of the present invention.
Figure 9A:
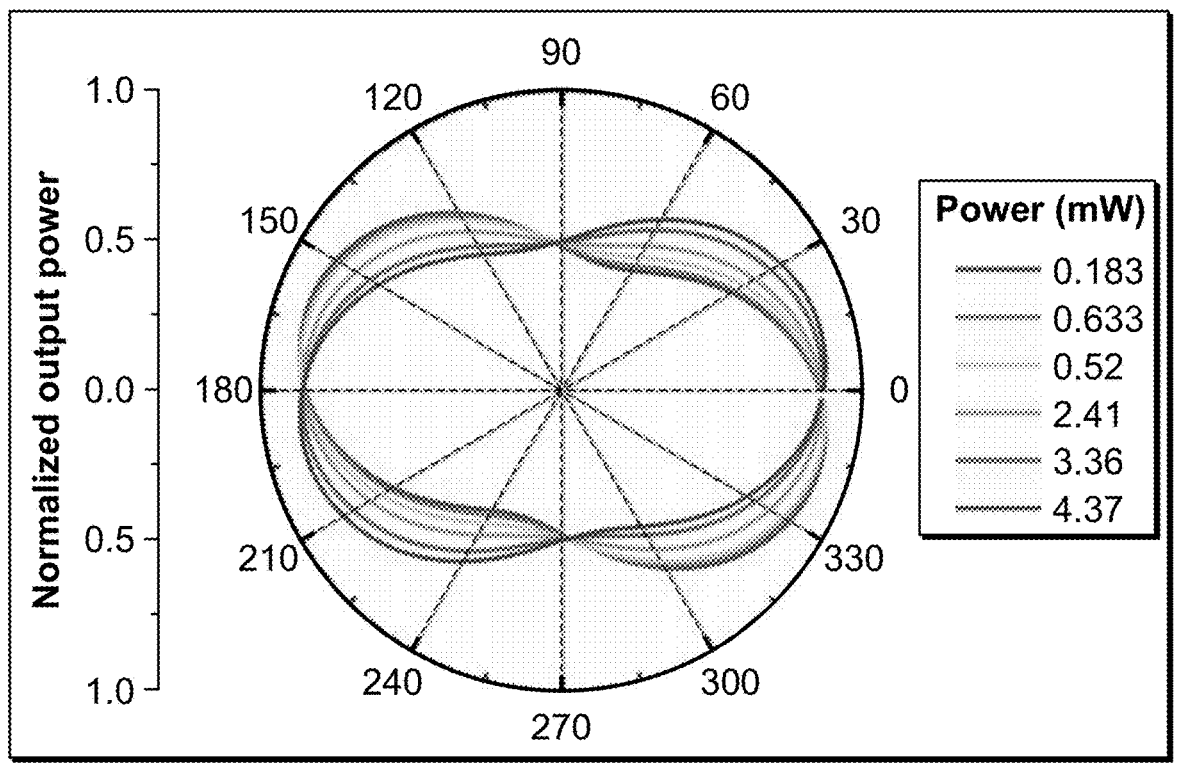
FIG. 9A shows the polarization state of the 1550 nm circularly polarized light passing through a piece of PM fiber at different power of 980 nm light passing through the same PM fiber for an embodiment of the present invention.
Figure 9B:
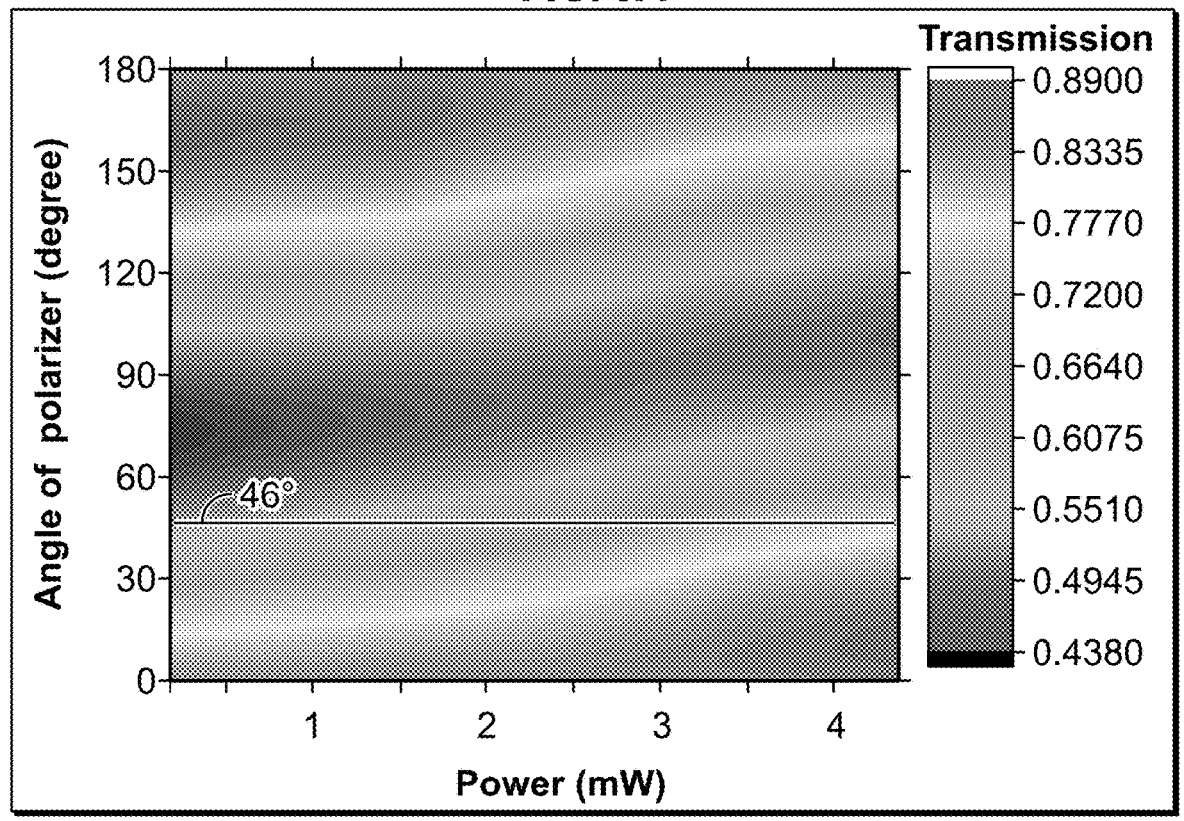
FIG. 9B depicts transmission versus the power of 980 nm laser at different angles of polarizer for an embodiment of the present invention.
Figure 9C:
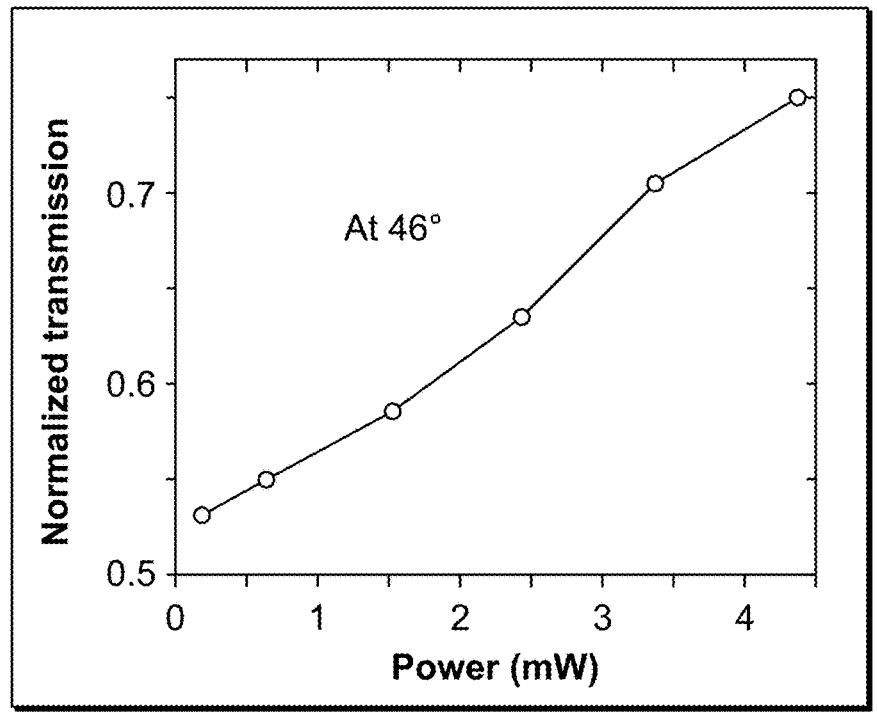
FIG. 9C shows the transmission of 1550 nm laser passing through the PM fiber at a polarizer angle of 46 degrees versus the power of 980 nm laser for an embodiment of the present invention.
Figure 9D:
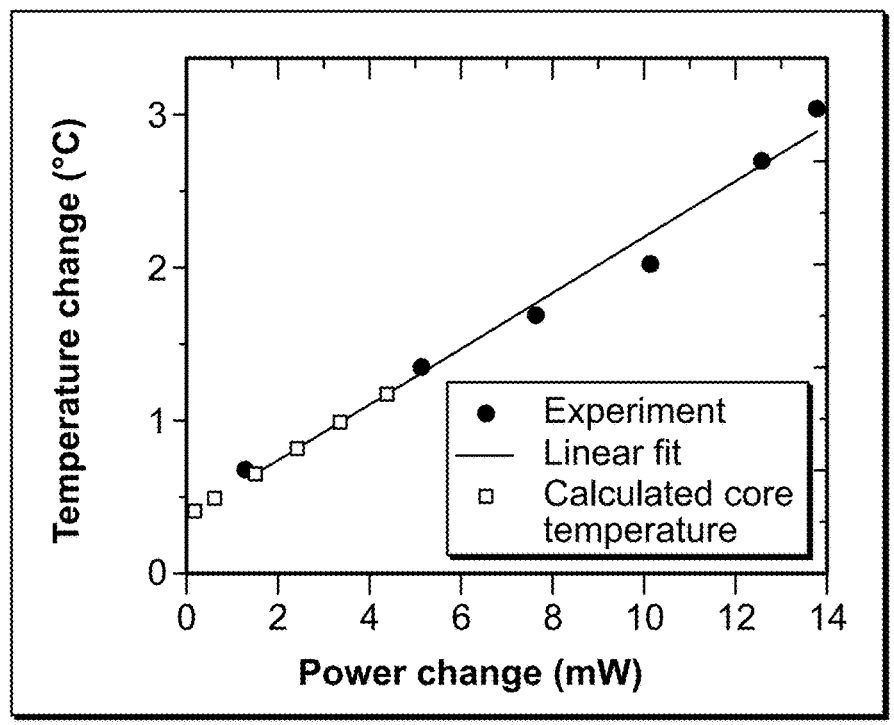
FIG. 9D is a temperature-power calibration curve that shows changes in temperature of the PM fiber versus changes in the power of light considering the different length of the PM fiber in each set of experiments for an embodiment of the present invention.

A very strong correlation between the polarization of light at different temperatures and power is illustrated in FIG. 8. As can be seen, decreasing the power of light passing through a piece of PM fiber corresponds to decreasing the temperature of the PM fiber. In other words, increasing or decreasing the temperature of PM fiber can be compensated by decreasing or increasing the power of light. FIG. 9D indicates the relation between changes in temperature of a fiber and power of light passing through the fiber. Therefore, any change in the power of 980 nm laser 520 will change the temperature of the fiber core which can be measured through polarization measurement at different power of 980 nm laser 520. As a 1550 nm laser 510 is used as a probe to measure the polarization of light, the 980 nm light is filtered out just before the power meter. The results are shown in FIGS. 9A-9D. The polarization state of the circularly polarized 1550 nm light passing through a piece of PM fiber at different power of 980 nm light passing through the same PM fiber is shown in FIG. 9A. The transmission of 1550 nm light at different power of the 980 nm laser through the polarizer at different angles and 46 degrees is depicted in FIGS. 9B and 9C, respectively. More than 20% change in transmission of light for only a few mW changes in the power of 980 nm light is an indication of the huge effect on the birefringence property of the PM fiber. Changes in the power of light causes changes in the temperature of the PM fiber. FIG. 9D quantifies the amount of change in the temperature of the fiber core, using the calibration curve, due to the change of the power of the 980 nm laser. This amount is about 0.75° C. for 4.19 mW change in power.

Stabilization

In other embodiments of the present invention, a sensitive fiber optical length stabilization can be achieved by monitoring the fiber temperature of a length of PM fiber through polarization modification of an initially circularly polarized beam launched through the fiber and correcting a change in temperature by adjusting the power of the beam sent through the fiber.

Figure 10:
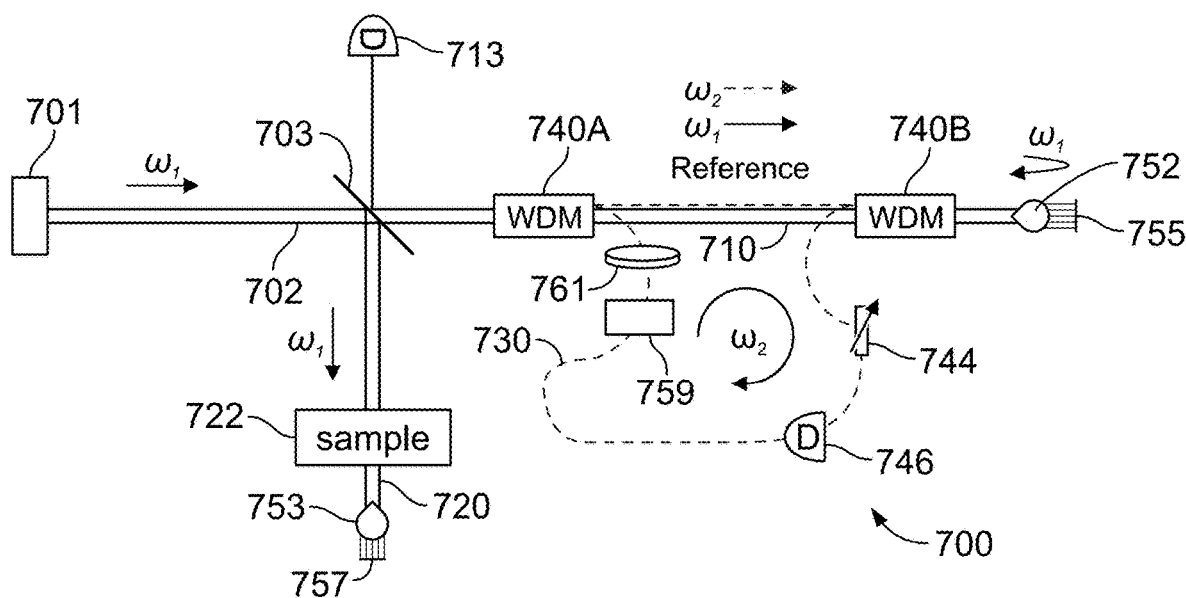
FIG. 10 illustrates the stabilization of the reference branch of a Michelson interferometer, by monitoring the polarization of a circularly polarized beam injected into the branch for an embodiment of the present invention.

In a preferred embodiment, as shown in FIG. 10, the present invention may be used to stabilize a Michelson type interferometer 700 having laser source 701. Arms 710 and 720 are PM fiber 702, with one branch 710 serving as a reference arm which is to be stabilized. The other arm, 720, may include sample 722 for analysis. The embodiment shown in FIG. 10 exploits the sensitivity of the PM fiber to both temperature and laser power for stabilization. A cw laser at optical frequency ω2 730 is sent circularly polarized in the reference branch of the Michelson via a WDM 740A The same wavelength is extracted from the end of the branch, through the second WDM 740B and a polarizer 744 coupled to detector 746 and amplifier 750. The detected signals are used in a feedback loop 760 to adjust the laser power at ω2 to maintain a constant polarization. Arm 710 terminates with collimator 752 and mirror 755. Arm 720 terminates with collimator 753 and mirror 757.

In use, system 700 operates as an optical interferometer that may be used to analyze a sample 722 on sample optical path 720. Sample path 720 is measured with a reference optical path 710 by interfering it on detector 713. A beam at frequency ω1 is generated by source 701 and is linearly polarized along the axis of the PM fibers 702 and split into two branches by beam splitter 703. The beams from either branch recombine on detector 713. The interference signal on detector 713 is a measure of the optical path difference between the two branches of the interferometer. For instance, destructive interference may be detected if the two optical paths are exactly equal. The change in the optical path in the sample can be due to anything that changes either the length or the index of refraction of the material in sample arm 720 such as the position of end mirror 757, change of index of the fiber or another material due to electric field, magnetic field or temperature. Reference arm 710 should have a constant optical path or the interference is meaningless.

Feedback loop 730 is also shown in FIG. 10 and is used as a method to keep reference optical path 710 constant. Beam ω2 is at a different wavelength so as to not interfere with the operation of the interferometer, which involves only the beam at ω1. Laser 759 may be a source of ω2 which is linearly polarized. The beam is made circularly polarized by quarter waveplate 761 before being launched into the reference arm and is extracted from the reference arm by a second WDM 740B. The state of polarization of the extracted beam is extremely dependent upon the optical path length between WDM 740A and 740B (temperature sensitivity of 0.02 deg, stress, and even the power of the laser at ω2 may affect the optical path.) The transmitted power measured after polarizer 744 depends on a nonlinear fashion on the power that was injected at ω2. Dependent on the angle of the polarizer, the transmission after the polarizer may show reduced sensitivity to input power changes, of (saturable absorption) may increase nonlinearly with increased power. Detector 744 placed after the polarizer looks at the transmission of ω2. The signal from detector 744 is amplified by amplifier 746 and used to control the power of the light at ω2 for instance through controlling the current through a semiconductor laser 759. By changing the power at ω2, one changes the optical path of the reference arm. With proper adjustment of the gain and phase of the feedback loop, any perturbation of the optical path of the reference arm results in a change in power at ω2 that will compensate that perturbation.

Figure 11:
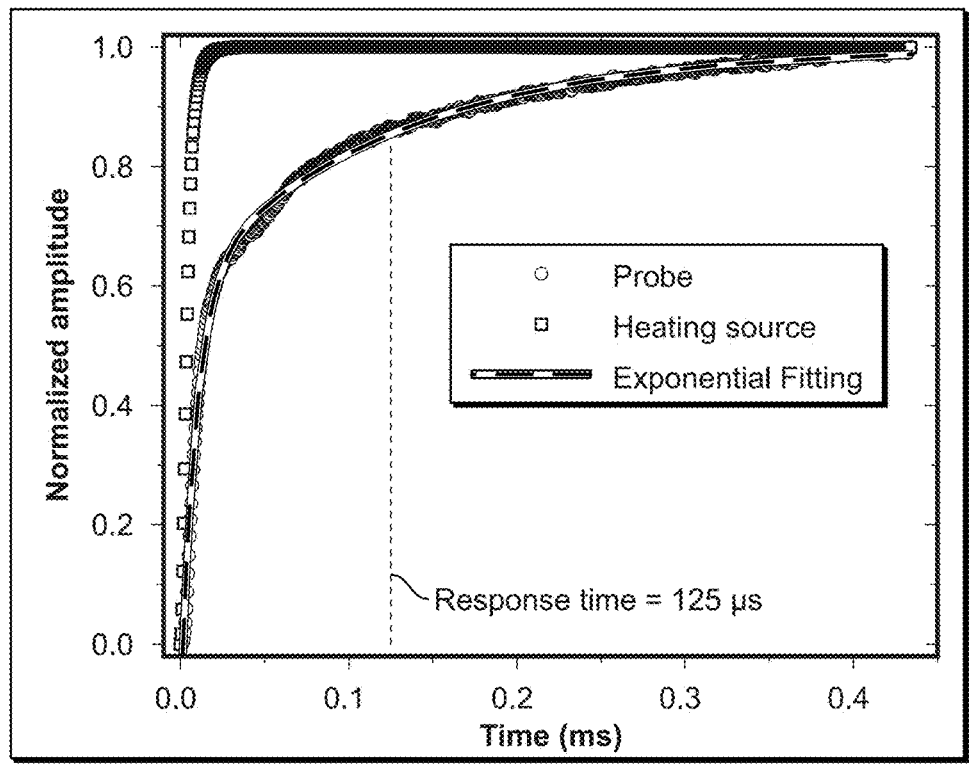
FIG. 11 is a response curve of the sensor shown in FIG. 7 as measured by 1550 laser (probe) to the fast changes of the 980 laser (heating source).

For this application, the response time of the sensor to the changes in temperature or power of light is very important. The same system shown in FIG. 7 is used in this application with power meter 590 replaced by a fast detector to see the fast changes. FIG. 11 shows a response curve 900 of the sensor to the change of power of 980 nm laser curve 910 when it is increased from 0 to 40 mW. These data are taken from an oscilloscope and normalized to 1 to make a comparison. The exponential fit has 1/e value of 0.125 ms, corresponding to a cut-off frequency of 8 kHz.

Simple Magnetometry

The beat length is also seen to be affected by a small magnetic field. The response can be enhanced by coiling the fiber such that the light propagates parallel to the magnetic field to be measured. The same coiling can be exploited for gradient magnetometry, in which several fibers have light circulating parallel to the magnetic field, and the same number of fibers have the fiber propagating in the opposite direction.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. An optical transmission stabilization system comprising: a laser source having a current controller for producing a polarized beam of a predetermined power; a polarization maintaining (PM) fiber having a fast axis and a slow axis; a polarizer; and wherein power transmitted by said polarizer depends in a nonlinear fashion on said polarized beam of a predetermined power and an angle of said polarizer;
wherein said laser source produces a circularly polarized transmission;
including a detector wherein a signal from said detector is fed to said current control to change said transmission of said laser source; and
wherein said PM fiber is a branch of an interferometer having a feedback loop that varies the power of said circularly polarized beam to maintain a constant optical path length of an optical fiber.

2. An optical transmission stabilization system comprising: a laser source having a current controller for producing a polarized beam of a predetermined power; a polarization maintaining (PM) fiber having a fast axis and a slow axis; a polarizer; and wherein power transmitted by said polarizer depends in a nonlinear fashion on said polarized beam of a predetermined power and an angle of said polarizer;
wherein said laser source produces a linearly polarized beam launched at an angle with respect of said slow axis of the PM fiber;
including a detector wherein a signal from said detector is fed to said current control to change said transmission of said laser source; and
wherein said PM fiber is a branch of an interferometer having a feedback loop that varies the power of said polarized beam to maintain a constant optical path length of an optical fiber.

3. An optical transmission stabilization system comprising: a laser source having a current controller for producing a polarized beam of a predetermined power; a polarization maintaining (PM) fiber having a fast axis and a slow axis; a polarizer; and wherein power transmitted by said polarizer depends in a nonlinear fashion on said polarized beam of a predetermined power and an angle of said polarizer;
wherein said laser source produces a circularly polarized transmission;
including a detector wherein a signal from said detector is fed to said current control to change said transmission of said laser source; and
wherein said PM fiber is a branch of an interferometer having a feedback loop that varies the power of said circularly polarized beam to maintain a constant optical path length of an optical fiber.

4. The optical transmission stabilization system of claim 1 wherein said angle of the polarizer attenuates fluctuations of input power.

5. The optical transmission stabilization system of claim 2 wherein said angle of the polarizer attenuates fluctuations of input power.

6. The optical transmission stabilization system of claim 1 wherein said angle of the polarizer is chosen such that the transmission of an input beam increases with power.

7. The optical transmission stabilization system of claim 2 wherein said angle of the polarizer is chosen such that the transmission of an input beam increases with power.

* * * * *